United States Patent [19]

Puri et al.

[11] 4,312,776

[45] Jan. 26, 1982

[54] BLOWING AGENT COMPOSITIONS

[75] Inventors: Rishi R. Puri, Hauxton; Kenneth T. Collington, St. Neots, both of England

[73] Assignee: FBC Limited, Hauxton, England

[21] Appl. No.: 195,741

[22] Filed: Oct. 10, 1980

[30] Foreign Application Priority Data

Oct. 11, 1979 [GB] United Kingdom .............. 35357/79

[51] Int. Cl.³ .............................................. C06D 5/04
[52] U.S. Cl. ..................................... 252/350; 521/85; 264/DIG. 5; 521/92; 521/95; 521/96; 521/97; 521/143; 521/149; 521/909
[58] Field of Search .................... 252/350; 521/92, 85, 521/95, 97

[56] References Cited

U.S. PATENT DOCUMENTS

| | | | |
|---|---|---|---|
| 3,658,730 | 4/1972 | Takahashi et al. | 521/92 |
| 3,846,350 | 11/1974 | Scheutger | 521/92 |
| 3,876,622 | 4/1975 | Motokawa et al. | 521/93 |

*Primary Examiner*—Morton Foelak
*Attorney, Agent, or Firm*—Morgan, Finnegan, Pine, Foley and Lee

[57] ABSTRACT

A blowing agent composition comprises azodicarbonamide, 0.005 to 5% by weight, based on the weight of azodicarbonamide, of a chromium sulphate, and 0.005–1% by weight, based on the weight of azodicarbonamide, of at least one zinc compound selected from zinc salts and oxides.

5 Claims, No Drawings

BLOWING AGENT COMPOSITIONS

The present invention relates to new blowing agent compositions, and their preparation and use.

When making an expanded material, such as a foamed synthetic polymeric material, for example a polyolefin, the polymeric material has conventionally been mixed with a blowing agent, such as azodicarbonamide. As technology has changed, the performance requirements of blowing agents have become more demanding.

One particular problem area has been the formulation of blowing agents for use in the production of expanded cross-linked polyolefins. Various proposals for blowing agent compositions have been made, but most have suffered from one or more drawbacks. Thus, for example, it has been proposed to formulate compositions of azodicarbonamide with various salts of chromium. While these compositions give an improved volume of gas over that from azodicarbonamide alone, the resulting products tend to have a coarse cell structure and a poor surface. However, we have now found that particularly desirable performance characteristics may be achieved, particularly in the production of expanded cross-linked polyolefins, by using azodicarbonamide in the presence of a chromium sulphate together with one or more zinc salts or oxides.

Accordingly, in one embodiment, the present invention provides a blowing agent composition comprising azodicarbonamide, 0.005 to 5% by weight, based on the weight of azodicarbonamide, of a chromium sulphate, and 0.005-1% by weight, based on the weight of azodicarbonamide, of at least one zinc compound selected from zinc salts and oxides.

The reason for the improved characteristics is not wholly understood, but there appears to be synergism between the chromium sulphate and the zinc compounds.

Preferred chromium sulphates are basic chromium sulphate of the approximate general formula $Cr_2(SO_4)_3.6H_2O$, the chromium sulphate of the approximate general formula $Cr_2(SO_4)_3.15H_2O$, and potassium chromium sulphate of the approximate general formula $KCr(SO_4)_2.12H_2O$.

The chromium sulphate is preferably present as 0.05 to 0.5% by weight based on the weight of azodicarbonamide.

Suitable zinc salts include zinc sulphate, nitrate, chloride, oxalate, o-phosphate, citrate, naphthenate, acetate, oleate, palmitate, tartrate, carbonate, octoate, stearate and mixtures thereof. Zinc chloride is particularly preferred.

The zinc compound is preferably present as 0.01-0.2% by weight based on the weight of axodicarbonamide.

The particle size of the azodicarbonamide will determine certain of the characteristics of the blowing agent composition, and it may be varied according to the end application. However, in general the mean particle diameter of the azodicarbonamide is suitably from 3 to 35 microns, preferably 7 to 25 microns. Such particle sizes are particularly suitable for use in the production of cross-linked expanded polyolefins.

The term 'mean particle diameter' as used herein means the theoretical sieve diameter which will retain 50% by weight of the particles in a sample as measured on a Coulter Counter.

The blowing agent compositions may also include additives, for example, for altering the blowing characteristics of the blowing agent or for the processing of the material to be expanded. Such additives include pigments, dyes, fillers, lubricants, anti-oxidants, flame retardants, plasticizers and fluorescent whitening agents. Particularly preferred additives are fume and colloidal silica, which are suitably present as 0.1-2.5% by weight based on the weight of azodicarbonamide.

The blowing agent compositions may be prepared by mixing the components together in the desired proportions, for example by dry blending, such as in a high speed blender or by ball milling, or by wet blending such as by solution coating onto the azodicarbonamide followed by drying. However, it has been found particularly advantageous to surface-coat the azodicarbonamide with the chromium sulphate and the zinc compound. This is conveniently achieved by spraying an aqueous solution or suspension of the chromium sulphate and zinc compound on to the azodicarbonamide. Alternatively, particulate azodicarbonamide may be stirred into an aqueous solution of the metal compounds, and the water evaporated.

While the compositions described above will generally be available as particulate mixtures which may be sold or stored as such, it will be appreciated that the compositions may also be made up in admixture with the material to be expanded.

Accordingly, the blowing agent composition may also contain a thermoplastic polymeric material.

The proportion of blowing agent to thermoplastic polymeric material will generally depend on the processing and techniques to be used. However, the composition suitable contains 0.1 to 25% (preferably 0.5 to 20%) parts by weight, based on weight of thermoplastic polymeric material, of azodicarbonamide.

Preferred thermoplastic polymeric materials include natural and synthetic resins (for example acrylonitrile—butadiene rubbers and blends of acrylonitrile—butadiene rubbers with polyvinyl chloride), polyvinyl chloride, polyvinylidene chloride, polyvinylacetate, polyethylvinyl acetate, polyesters (for example polyethylene terephthalate, and polybutylene terephthalate), pololefins (for example low and high density polyethylene, and polypropylene), modified polyphenylene oxides, polystyrenes, natural and synthetic rubbers (for example ethylene—propylene rubber, nitrile rubbers, polyisoprene rubber), copolymers of the monomers amongst themselves or with other monomers, (for example a copolymer of ethylvinyl acetate and olefin (such as ethylene or propylene) and mixtures thereof.

Particularly preferred thermoplastics polymeric materials include polyolefins (for example, low and high density polyethylene and polypropylene) and olefin copolymers (for example, copolymers of ethylene and ethylvinyl acetate), preferably those which may be cross-linked before expansion, for example, by means of chemical cross-linking agents or by ionising radiation.

In a preferred embodiment, the composition includes a cross-linking agent, for example, an organic peroxide, notably dicumyl peroxide, t-butylhydroperoxide, cumyl-t-peroxide, di-t-butylperoxide, bis-(t-butylperoxyisopropyl)benzene or 2,5-dimethyl-2,5-di(t-butyl)peroxyhexane, or an azide such as 10-decan-bis-sulphonazide, or p-quinoedioxin. A preferred cross-linking agent is dicumyl peroxide. In this respect, it has been noticed that the presence of the metal compounds in the composition not only improves the performance of the azodicarbonamide, but in many instances they also appear to accelerate the cross-linking rate of the peroxides, thereby improving the possibility of complete cross-linking before expansion occurs in continuous cross-linking expansion processes. However, the presence of a cross-linking accelerator may also be desirable, suitable accelerators including ethylene glycol dimethacrylate, trimethyl propane trimethacrylate, and triallyl cyanurate.

The expandable composition may be prepared by any of the conventional techniques of compounding all the ingredients together, for example by milling or by incorporating the ingredients into one another separately and in any order. However, it will generally be preferred to formulate separately the blowing agent composition described above, and incorporate this, with any other ingredients, into the thermoplastic polymeric material, either to form a polymer concentrate which is subsequently mixed with a thermoplastic polymeric material, or to form the expandable composition itself.

After mixing the ingredients, the expandable composition may be subjected to further treatment, for example, extrusion, calendering and/or cross-linking.

In a further embodiment, the present invention provides a process for preparing an expanded thermoplastic material which comprises heating, in one or more stages, an expandable composition comprising:

(a) a thermoplastic polymeric material, 0.1-25% by weight of azodicarbonamide based on the weight of thermoplastic polymeric material, 0.005 to 5% by weight of chromium sulphate, based on the weight of azodicarbonamide, and 0.005-1% by weight of at least one zinc compound selected from zinc salts and oxides, based on the weight of azodicarbonamide, to a temperature above the softening point of the thermoplastic polymeric material to cause the decomposition of the azodicarbonamide and the expansion of the composition.

Preferably the expandable composition is a composition as described above.

In a preferred process the thermoplastic polymeric material is selected from polyolefins (for example, low and high density polyethylene and polypropylene) and olefin copolymers (for example, copolymers of ethylene and vinyl acetate), and the expandable composition is subjected to a cross-linking step before expansion. Suitably the expandable composition includes a cross-linking agent, for example, an organic peroxide, notably dicumyl peroxide, t-butylhydroperoxide, cumyl-t-peroxide, di-t-butylperoxide, bis(t-butylperoxy-isopropyl)benzene or 2,5-dimethyl-2,5-di(t-butyl)-peroxyhexane, or an azide such as 10-decan-bis-sulphonazide or p-quinone dioxin, and is heated in a first stage to a temperature at which cross-linking is effected.

When cross-linking is partly or substantially complete, expansion may be effected, for example at a temperature in the range 150°-270° C.

In a particularly preferred process, the expandable composition is extruded, cross-linked and expanded. The process may be a continuous or discontinuous process.

The following examples, in which all parts and percentages are by weight, are given to illustrate the invention.

EXAMPLES 1-10

Masterbatches were produced by mixing 100 parts low density polyethylene, 50 parts of blowing agent mixture as set out in the table below, and 2.4 parts dicumyl peroxide for 10 minutes on a mill held at 105° C. In the table, the proportion of chromium sulphate and zinc chloride is shown as parts per 100 parts of azodicarbonamide. The azodicarbonamide had an average particle diameter of 16 microns or 10 microns as shown.

The resulting masterbatches were each mixed with 200 parts of low density polyethylene and extruded to form a sheet of thickness 3 mm. A sample was cut from each sheet and expanded in a hot air oven. Temperature and residence time were varied to achieve optimum results.

The foam densities and cell counts (number of cells per unit area as measured by projection microscopic analysis) were determined and are shown in Table I. The higher the cell count, the better the properties of the foamed product. The lower the density, the greater the degree of foaming.

The quality of cell distribution and the surface properties of the product were also noted and are shown in Table 1.

TABLE 1

| EXAMPLE NUMBER | AZODICARBONAMIDE PARTICLE DIAMETER (MICRONS) | CHROMIUM SULPHATE $CR_2(SO_4)_3 \cdot 6H_2O$ | CHROMIUM SULPHATE $Cr_2(SO_4)_3 \cdot 15H_2O$ | ZINC CHLORIDE | DENSITY $Kg/m^3$ | CELL COUNT | DESCRIPTION OF FOAMED PRODUCT | |
|---|---|---|---|---|---|---|---|---|
| | | | | | | | CELL QUALITY | SURFACE QUALITY & DECOMPOSITION CHARACTERISTICS |
| 1 | 16 | — | — | — | 46 | 14 | Non-uniform | Yellow |
| 2 | 16 | 0.2 | — | — | 38 | 14 | Non-uniform | Yellow. Slow decomposition of blowing agent |
| 3 | 16 | — | — | 0.04 | 38 | 13 | Non-uniform | Yellow. Slow decompostion of blowing agent |
| 4 | 16 | — | — | 0.12 | 48 | 10 | Non-uniform | Decomposition faster than Example 3, but product had holes in surface |
| 5 | 16 | 0.1 | — | 0.12 | 30 | 22 | Fine uniform cell structure | Smooth surface |
| 6 | 16 | 0.2 | — | 0.07 | 31 | 21 | Very fine uniform cell structure | Smooth surface |
| 7 | 16 | 0.3 | — | 0.04 | 32 | 22 | Very fine cell structure | Smooth surface |
| 8 | 16 | 0.3 | — | 0.07 | 32 | 22 | Very fine uniform cell | |

TABLE 1-continued

| EXAMPLE NUMBER | AZODI-CARBONAMIDE PARTICLE DIAMETER (MICRONS) | CHROMIUM SULPHATE $Cr_2(SO_4)_3 \cdot 6H_2O$ | CHROMIUM SULPHATE $Cr_2(SO_4)_3 \cdot 15H_2O$ | ZINC CHLORIDE | DENSITY $Kg/m^3$ | CELL COUNT | CELL QUALITY | SURFACE QUALITY & DECOMPOSITION CHARACTERISTICS |
|---|---|---|---|---|---|---|---|---|
| 9 | 10 | 0.2 | — | 0.07 | 33 | 18 | Good cell structure | Smooth surface |
| 10 | 10 | — | 0.2 | 0.7 | 33 | 18 | Good cell structure | Smooth surface |

EXAMPLE 11

Azodicarbonamide (100 parts) was charged to a mixer. A hot solution of basic chromium sulphate (0.2 parts) and zinc chloride (0.06 parts) in water (3 parts) was sprayed onto the surface of the mixed azodicarbonamide. After spraying, the solvent was removed by the application of heat under vacuum. The blowing agent was agitated while being cooled.

The blowing agent so prepared was tested in the formulation of Examples 1-10, producing a fine uniform cross-linked foam of average density 30 kg/m³.

EXAMPLE 12

The process of Example 11 was repeated but with a solution containing basic chromium sulphate (0.2 parts) and zinc sulphate (0.08 parts).

The cross-linked product prepared from this blowing agent had a fine uniform cell structure similar, but not equal, to that of the foam of Example 11.

EXAMPLE 13

The process of Example 11 was repeated but with a solution of basic chromium sulphate (0.2 parts) in the presence of zinc oxide and zinc carbonate (0.12 parts).

The cross-linked product prepared from this master batch had a fine uniform cell structure and a density of 45 kg/m³.

EXAMPLE 14

An expandable formulation was prepared by milling together at 105° C. the following:

| | |
|---|---|
| Low density polyethylene | 100 parts |
| Dicumyl peroxide | 1 |
| Blowing agent of Example 11 | 20 |
| Flame retardent (SAYTEX 102) | 15 |
| Antimony trioxide ($Sb_2O_3$) | 4 |

The milled formulation was extruded at 115°-120° C. to produce a cross-linked foam of fine uniform cell structure and a density of 40 kg/m³.

EXAMPLE 15-24

The process of Example 14 were repeated using the formulations set out in Table 2. All these formulations produced a cross-linked foamed product having fine uniform cell structure and a good surface.

TABLE 2

| Example No | 15 | 16 | 17 | 18 | 19 | 20 | 21 | 22 | 23 | 24 |
|---|---|---|---|---|---|---|---|---|---|---|
| Low density polyethylene | 100 | 90 | 90 | 80 | 97.5 | 95 | 97.5 | 95 | 85 | 90 |
| High density polyethylene CL-100-35-JN* | | 10 | | 20 | | | | | 15 | |
| High density polyethylene CL-50-35-JN* | | | 10 | | | | | | | |
| Ethylene vinyl acetate resin | | | | | | | | | | 10 |
| Modifier (KELTAN 520) | | | | | 2.5 | 5 | | | | |
| Modifier (KELTAN 520 × 50) | | | | | | | 2.5 | | | |
| Styrene butadiene rubber (SOLPRENE 416) | | | | | | | | 5 | | |
| Dicumyl peroxide | 0.8 | 0.8 | 0.8 | 0.8 | 0.8 | 0.8 | 0.8 | 0.8 | 0.9 | 0.8 |
| Blowing agent (of Example 11) | 16.6 | 16.6 | 16.6 | 16.6 | 16.8 | 16.6 | 16.6 | 16.6 | 22.0 | 16.6 |

*CL-100-35-JN and CL-50-35-JN are rotational moulding grades of high density polyethylene available from Phillips Petroleum.

We claim:

1. A blowing agent composition comprising azodicarbonamide, 0.005 to 5% by weight, based on the weight of azodicarbonamide, of a chromium sulphate, and 0.005–1% by weight, based on the weight of azodicarbonamide, of at least one zinc compound selected from zinc salts and oxides.

2. A blowing agent composition according to claim 1 wherein the chromium sulphate is selected from basic chromium sulphate of the approximate general formula $Cr_2(SO_4)_3.6H_2O$, the chromium sulphate of the approximate general formula $Cr_2(SO_4)_3.15H_2O$, and potassium chromium sulphate of the approximate general formula $KCr(SO_4)_2.12H_2O$.

3. A blowing agent composition according to claim 1 wherein the zinc salt is selected from zinc sulphate, nitrate, chloride, oxalate, o-phosphate, citrate, naphthenate, acetate, oleate, plamitate, tartrate, carbonate, octoate, stearate and mixtures thereof. Zinc chloride is particularly preferred.

4. A blowing agent composition according to claim 1 and containing a thermoplastic polymeric material.

5. A process for the preparation of a blowing agent according to claim 1 which comprises spraying an aqueous solution or suspension containing the chromium sulphate and the zinc compound onto the azodicarbonamide.

* * * * *